E. FLENTJE.
SHOCK ABSORBER.
APPLICATION FILED APR. 8, 1908.
899,662.
Patented Sept. 29, 1908.
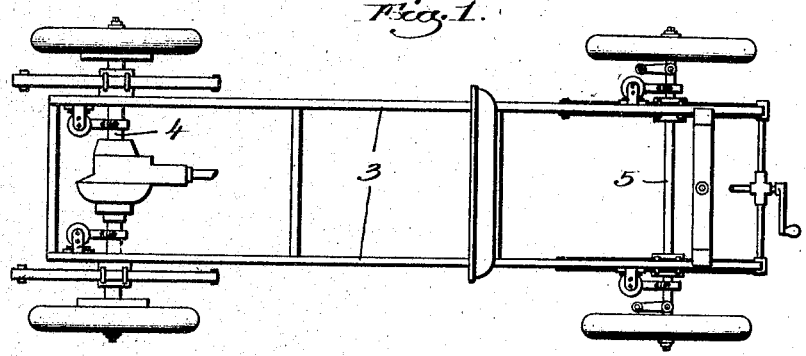
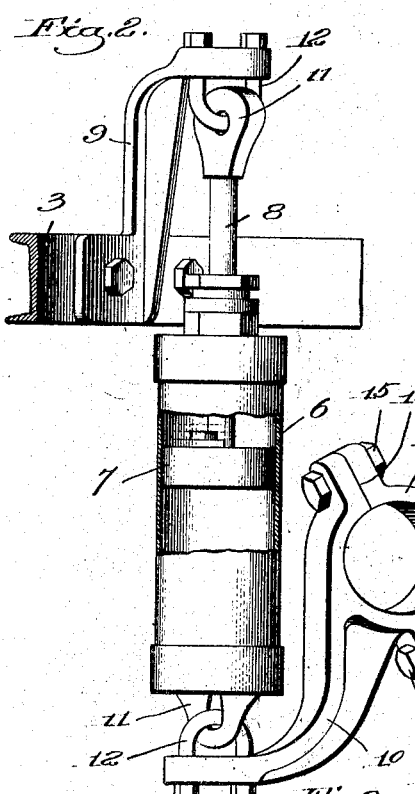
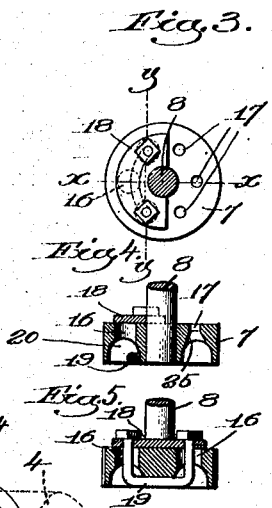
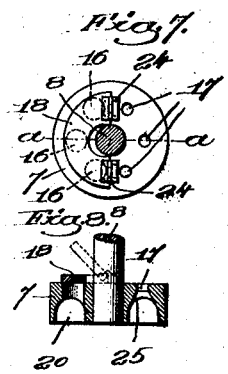
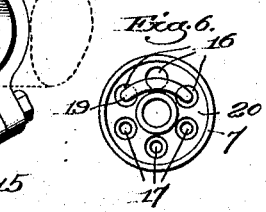
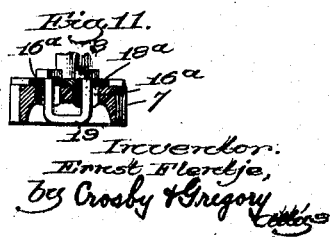
Witnesses:
Fred. L. Chumbof
Joseph M. Ward.
Inventor:
Ernest Flentje,
by Crosby & Gregory
Attys.

UNITED STATES PATENT OFFICE.

ERNST FLENTJE, OF CAMBRIDGE, MASSACHUSETTS.

SHOCK-ABSORBER.

No. 899,862.  Specification of Letters Patent.  Patented Sept. 29, 1908.

Application filed April 6, 1908. Serial No. 425,352.

*To all whom it may concern:*

Be it known that I, ERNST FLENTJE, a citizen of the United States, residing at Cambridge, county of Middlesex, and State of Massachusetts, have invented an Improvement in Shock-Absorbers, of which the following description, in connection with the accompanying drawing, is a specification, like letters on the drawing representing like parts.

This invention relates to shock absorbers such as are designed to be used on automobiles and similar vehicles for preventing too violent rebound of the springs when they are compressed and for causing the body to have an easy riding movement.

The device herein illustrated is of the dash-pot type wherein the resistance offered to the recoil of the springs is afforded by a cylinder containing a liquid, such, for instance, as glycerin, within which operates a piston.

The object of my invention is to provide a novel shock absorber of this type which will cushion the action of the spring in both directions, but which will have a greater cushioning effect in opposition to the recoil of the spring than to its compressing movement; and also to provide a dash-pot of a novel construction wherein the cushioning or retarding action of the movement of the spring will be accomplished without any sudden jerks or jars.

I will first describe one embodiment of my invention and then point out the novel features thereof in the appended claims.

In the drawings, Figure 1 is a top plan view of the chassis of an automobile showing my improvements applied thereto; Fig. 2 is an enlarged view showing my improved device, part of the cylinder being broken out to better show the construction of the piston; Fig. 3 is a top plan view of the piston; Fig. 4 is a section on the line $x$—$x$, Fig. 3; Fig. 5 is a section on the line $y$—$y$, Fig. 3; Fig. 6 is a bottom plan view of the piston; Fig. 7 illustrates a different form of piston from that shown in the other views; Fig. 8 is a section on the line $a$—$a$, Fig. 7; Fig. 9 is a top plan view of a piston having a different arrangement of ports from that illustrated in the other views; Fig. 10 is a view similar to Fig. 9 showing the valve for controlling the ports in position; Fig. 11 is a section on the line $b$—$b$, Fig. 10.

In Fig. 1 3 designates the chassis of an automobile, 4 the driving axle, and 5 the front axle. These parts may be of any suitable or usual construction.

My improved shock absorber comprises the cylinder 6 adapted to contain glycerin or other suitable liquid and within which operates a piston 7 which has secured thereto a piston-rod 8. The piston-rod is connected by a universal joint connection with an arm or bracket 9 which is secured to the chassis or frame 3, and one end of the cylinder is connected by a universal joint connection with a bracket or arm 10 which is secured to one of the axles.

I prefer to use universal joint connections between the cylinder and the brackets in order that the parts may not bind, and while it is within my invention to use any suitable connection of this type, yet I prefer that herein shown which comprises an eye 11 formed on the end of the piston-rod and on the end of the cylinder, which eye has extending therethrough the U-shaped loop 12 that is connected to the bracket 9 or 10. The bracket 10 is arranged to be detachably secured to the axle, and for this purpose the part thereof which embraces the axle is split at 13 to form the clamping piece 14 which is clamped to the main part by means of clamping screws 15.

The piston 7 is arranged with ports as usual in dash-pot construction through which the liquid within the cylinder can pass. In my invention, however, the ports and the valves controlling them are especially arranged so that the movement of the frame relative to the axles will be an easy cushioning movement free from jerks or jars.

In the present embodiments of my invention the piston is provided with two sets of ports, the ports of one set being larger than the other, and the set of larger ports being controlled by a valve, while the set of smaller ports are continuously open. In Figs. 3–8 I have shown three ports in each set, and in Figs. 9–11 I have shown four large ports and two small ports. The number of ports is not essential to my invention, however. In Figs. 3–8 the three largest ports are designated 16 and the three smaller ports 17. The three larger ports 16 are controlled by a valve 18 which is herein shown as a plate resting on the top of the piston and having a shape to cover the ports 16. Means are provided for limiting the upward movement of the valve or clapper 18, but in the embodiment shown in Figs. 3 to 6, this is provided for by securing to the clapper a U-shaped retaining member 19, the arms of which extend down through two of the ports 16 and the bridge of which is situated beneath the piston, said piston being preferably hollowed out in its lower side, as at 20, to receive the retaining member. In Figs. 7 and 8 the valve 18 which is substantially semi-circular is hinged to the top of the piston at the diametral edge, as at 24, so that it may swing into the dotted line position Fig. 8. With this construction it will be seen that when the springs of the automobile are compressed, the piston 7 will be forced downwardly in the cylinder and the liquid will be forced up through both the continuously-open ports 17 and through the larger ports 16, the valve 18 lifting to permit the liquid to pass through said ports 16.

When the springs begin their recoil, the upward movement of the piston 7 will cause the valve 18 to close the ports 16 and the piston can then move upwardly only as fast as the liquid can pass through the ports 17. The valve 18 has a comparatively small opening movement and will, therefore, be closed the instant that the piston begins its upward movement. As a result, the upward movement of the piston will be uniform and the recoil of the spring will be slow and moderate and without any bouncing action.

In Figs. 9, 10 and 11 I have shown an embodiment of my invention wherein the ports through the piston are symmetrically arranged. In this embodiment there are four large ports marked $16^a$ and two small ports marked $17^a$. The two small ports are diametrically arranged and the large ports are arranged two on each side of the piston. The valve $18^a$ for closing these ports is shown in Fig. 10 as it will be arranged on top of the piston. It is a symmetrical piece provided with a central aperture 30 through which the piston-rod 8 extends and with two other apertures 31 that are in line with the small ports $17^a$. The valve is arranged to cover the larger ports $16^a$ as shown clearly in Fig. 10. The upward movement of this valve is limited by two U-shaped retaining members 19 which extend through the ports $16^a$, as shown in Fig. 11. The advantage of this construction is that since the ports and the valves have a symmetrical arrangement, the pressure on the piston when it moves either up or down, is uniformly distributed so that the piston will not be liable to bind against the sides of the cylinder. When the piston has the arrangement of ports shown in Figs. 3-6 with the constantly open ports on one side of the piston, it is possible that the piston might tend to twist a little during its movement.

The ports 17 are preferably tapered, as shown at 25 in Figs. 4 and 8. I find that by making them of this shape the liquid will pass through them upwardly more freely than downwardly, and this is a desirable feature. I have found from practice that a shock absorber as above described will prevent all rebound or recoil when the springs of the automobile are compressed and will give an easy motion to the vehicle.

I prefer to use a device such as shown in Fig. 2 at each corner of the vehicle body, as shown in Fig. 1. The shock absorber on the rear axle may conveniently be placed within the body, in which case the bracket 9 will be fastened to the inside of the side sill of the frame 3, and the bracket 10 will be secured to the axle inside of the frame, as shown in Fig. 1. On the front axle I find it convenient to place the shock absorber outside of the chassis or frame, in which case the bracket 9 will be secured to the outside of the side sill of the frame, while the bracket 10 will be secured to the front axle outside of the frame.

Having fully described my invention, what I claim as new and desire to secure by Letters Patent is:—

1. In a shock absorber, the combination with a cylinder to contain liquid, of a piston therein, said piston having a plurality of large ports and a plurality of small ports, a valve situated above the piston and arranged to close the large ports while leaving the small ports open, and a U-shaped retaining device secured to the valve or plate and extending through two of the ports for limiting the upward movement of the valve.

2. In a shock absorber, the combination with a cylinder to contain liquid, of a piston therein, said piston having a plurality of large ports and a plurality of small ports, a plate situated above the piston and arranged to close the large ports while leaving the small ports open, and a U-shaped retaining device secured to the valve or plate and extending through two of the ports for limiting the upward movement of the valve, the piston being hollowed out on its under side to receive said retaining device.

In testimony whereof, I have signed my name to this specification, in the presence of two subscribing witnesses.

ERNST FLENTJE.

Witnesses:
LOUIS C. SMITH,
THOMAS J. DRUMMOND.